(12) United States Patent
Aue et al.

(10) Patent No.: US 8,634,351 B2
(45) Date of Patent: Jan. 21, 2014

(54) LTE BASEBAND RECEIVER AND METHOD FOR OPERATING SAME

(75) Inventors: Volker Aue, Dresden (DE); Andreas Bury, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 289 days.

(21) Appl. No.: 13/159,129

(22) Filed: Jun. 13, 2011

(65) Prior Publication Data

US 2011/0305198 A1 Dec. 15, 2011

(30) Foreign Application Priority Data

Jun. 11, 2010 (EP) .................................... 10165709

(51) Int. Cl.
  *H04W 4/00* (2009.01)
(52) U.S. Cl.
  USPC .............................. 370/328; 375/324; 375/340
(58) Field of Classification Search
  USPC ............................ 370/328; 375/324, 340–341
  See application file for complete search history.

(56) References Cited

U.S. PATENT DOCUMENTS

| | | | | |
|---|---|---|---|---|
| 7,684,503 | B2 * | 3/2010 | Hayashi | 375/260 |
| 7,778,357 | B2 * | 8/2010 | Alcouffe | 375/316 |
| 7,979,775 | B2 * | 7/2011 | Yu et al. | 714/755 |
| 8,526,518 | B2 * | 9/2013 | Feigin et al. | 375/260 |
| 2004/0208138 | A1 * | 10/2004 | Hayashi et al. | 370/286 |

FOREIGN PATENT DOCUMENTS

| | | | |
|---|---|---|---|
| WO | 2005062516 A1 | 7/2005 | |
| WO | WO 2005062516 A1 * | 7/2005 | ............... H04L 1/20 |

\* cited by examiner

*Primary Examiner* — Ayaz Sheikh
*Assistant Examiner* — Mounir Moutaouakil
(74) *Attorney, Agent, or Firm* — SpryIP, LLC (57) ABSTRACT

An LTE baseband receiver and a method for operating the receiver are provided. The receiver comprises a frequency selective interference estimator, an interference level averager and an interference assessor operative to control which output of the frequency selective interference estimator or the interference level averager is to be supplied to a soft-metric calculator. Frequency selectivity of the interference is assessed, and the best mode of interference estimation is selected to increase LTE receiver performance in loaded networks without impacting receiver performance in unloaded networks.

7 Claims, 8 Drawing Sheets

LTE BASEBAND RECEIVER AND METHOD FOR OPERATING SAME

CROSS REFERENCE TO RELATED APPLICATIONS

This application claims priority of European application No. 10165709.6 filed on Jun. 11, 2010, the entire contents of which is hereby incorporated by reference herein.

FIELD OF THE INVENTION

The invention relates to an LTE compliant baseband receiver, in particular an OFMD baseband receiver. The invention also relates to a method for operating such a baseband receiver.

BACKGROUND OF THE INVENTION

3GPP's LTE standard uses Orthogonal Frequency Division Multiple Access as the primary multiple access scheme for the downlink. Noise and interference levels need to be taken into account at the receiver for optimum performance. As cellular networks get loaded with users, interference from other cells becomes the most dominant source of interference. Since the other cells employ the same standard, this interference is likely to be highly frequency selective. Thus, frequency selective interference estimation and inclusion of the estimates in the soft-metrics for the forward error correction is likely to increase the receiver performance. Unfortunately, as frequency selective interference can be estimated less accurately, the receiver performs worse in noise limited scenarios than a receiver that only takes the average interference level into account.

Maximum likelihood decoding is an approach to achieve the best possible performance by identifying the sequence of presumably transmitted information from a received signal that has been sent using a maximum likelihood (ML) approach. The theory is well known (see e.g. J. G. Proakis, Digital Communications, 2nd ed., McGraw-Hill, 1989). Turbo and Viterbi decoders provide an ML estimate for received turbo encoded code blocks and convolutional encoded code blocks, respectively, provided that the encoded sequence include the correct soft-metrics. A soft-metric represents the likelihood that the received bit is correct. The soft-metrics can be related to the signal-to-noise ratio for that bit.

In wireless communications, where the mobile channel is characterized by time and frequency selective fading, the signal strength can vary substantially over time and frequency. As thermal noise is additive to the received signal at the receiver antennas and the thermal noise is typically wideband, the thermal noise level can be assumed constant for each received symbol.

As cellular communication systems get loaded with multiple users, cellular communication systems become interference limited rather than noise limited. Interference limitation means that the mobile receiver's performance is not limited by the signal strength with respect to the thermal noise level, but by the interference originating from other users or base stations in the network operating at the same frequency. Noise limitation is only relevant for the so called network edges, that is, those cell edges where the mobile has to operate at maximum sensitivity level.

The new cellular standard developed by the 3rd generation partnership program (3GPP) called Long Term Evolution (LTE) offers unprecedented data rates and unprecedented shortest latency to the end customer while at the same time promising a high spectral efficiency for the network operator. This allows network operator to make best use of the available spectrum.

The LTE standard separates a channel into time and frequency blocks that can be allocated to a specific mobile terminal in the downlink, i.e., in transmissions from base station to a terminal. The time granularity is one slot that has a fixed duration of 0.5 ms. Orthogonal frequency division multiple access (OFDMA) is used to distribute the available downlink bandwidth to multiple users. In OFDMA, all user information is modulated using Orthogonal Frequency Division Multiplexing (OFDM), where each user is assigned a different set of subcarriers.

Figure 1:
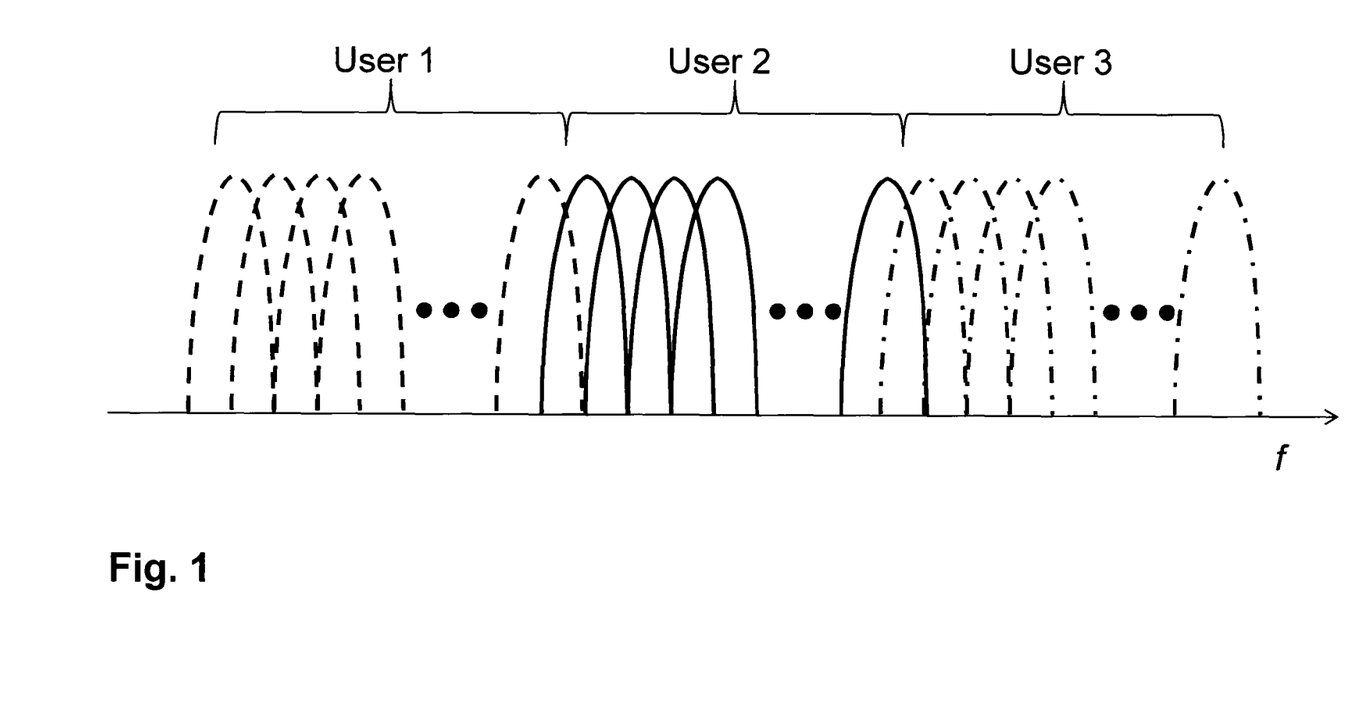
FIG. 1 illustrates basic principles of OFDMA.
Figure 2:
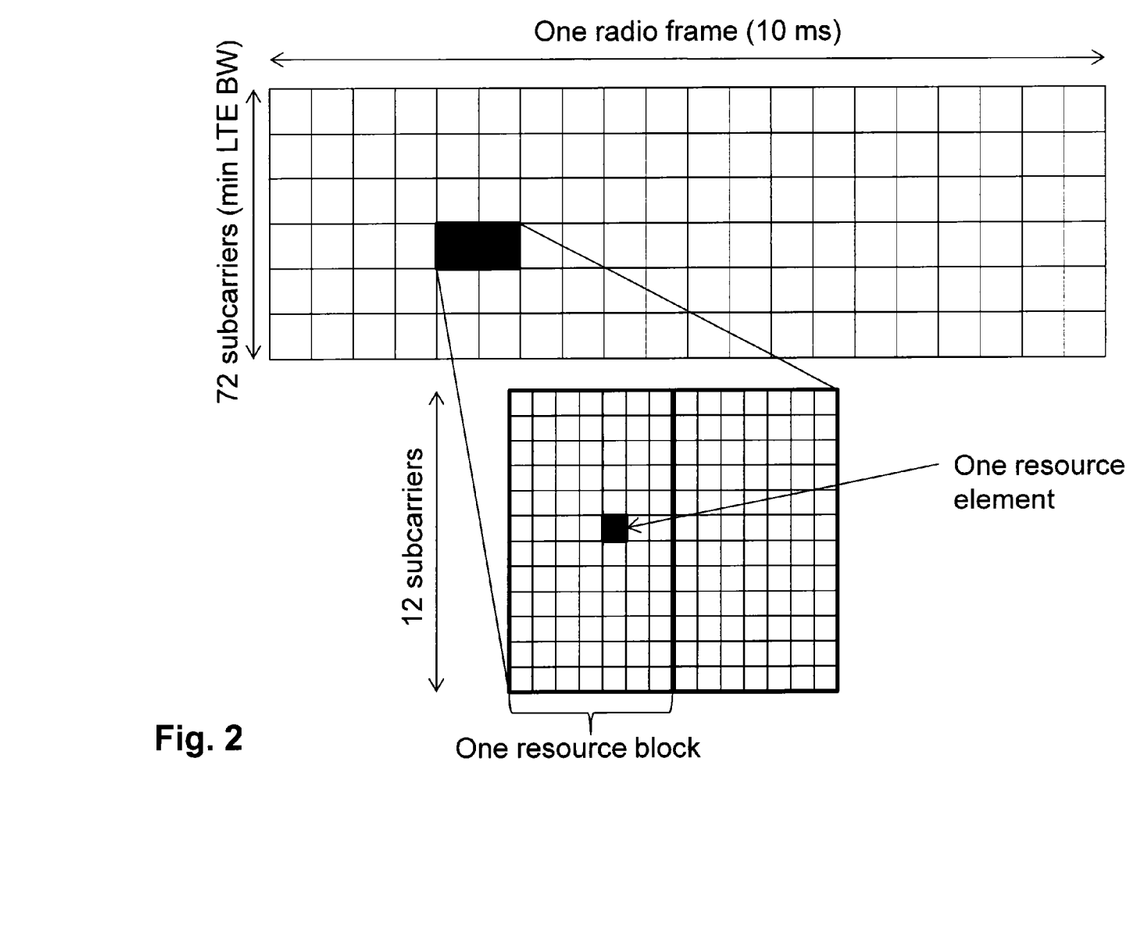
FIG. 2 shows an LTE time-frequency grid.

FIG. 1 illustrates how OFDMA works. Here, the available subcarriers of the downlink signal are given to three different users. LTE makes assignment to different users, by overlaying a grid over the time-frequency plane. This grid is referred to as the time-frequency grid. The smallest block addressable by the system is called a resource block (RB). It consists of 12 OFDM subcarriers over one time-slot. RBs are always allocated to a user in a pair of two successive RBs. FIG. 2 illustrates the concept of the time-frequency grid and RBs for a channel where only 72 subcarriers are used. Such a channel fits into a 1.6 MHz channel and uses the minimum defined bandwidth in LTE.

An RB always consists of 12 subcarriers and has a duration of 0.5 ms which are 6 or 7 OFDM symbols depending on the mode the base station uses.

Figure 3:
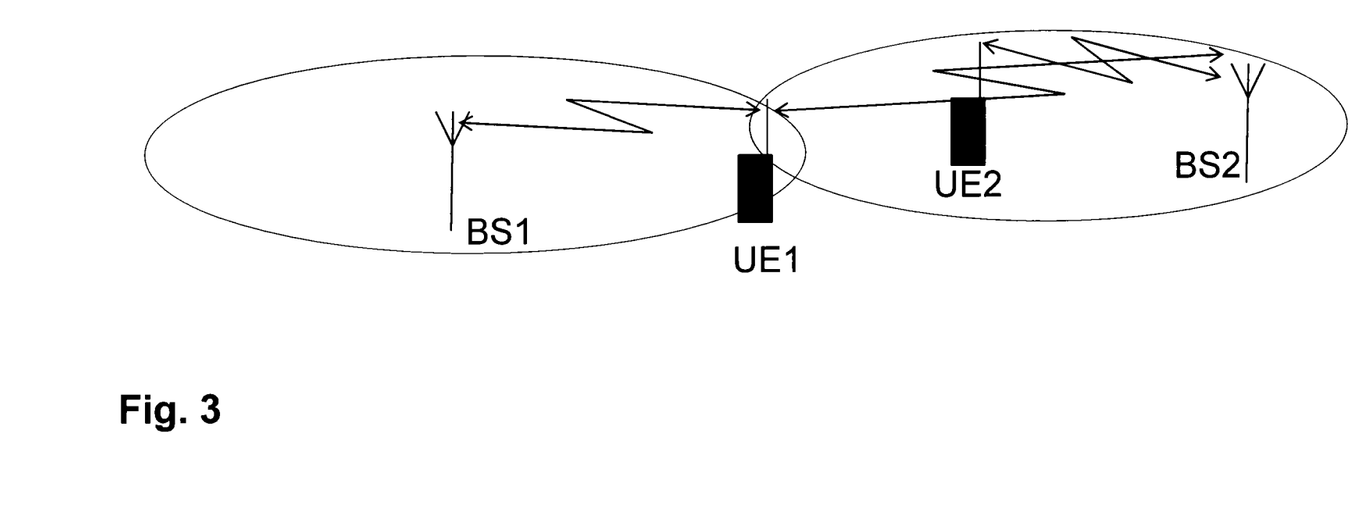
FIG. 3 illustrates co-channel interference.

As the network gets loaded, as described above, users get more exposed to signals received from adjacent cells operating at the same frequency (co-channel) than to thermal noise. FIG. 3 shows an illustrative example of co-channel interference. Terminal UE1 (UE—User Equipment) not only receives a signal from the left hand cell served by base station 1 (BS1) but is also exposed to the right hand cell served by BS2. Thus, UE1 receives the signal of BS2 intended for UE2 as interference.

As the origin of the interference is also an LTE base station transmitter, its characteristics are similar to the wanted signal:
(1) The interfering base station (BS2) assigns different RBs to different users, with different beam forming patterns and power levels. RB allocations vary from one sub-frame to the next.
(2) The interfering signals received by UE1 from BS2 are received via a mobile communications channel.

Thus, the interference is highly time and frequency-selective.

In a real system, the communication channel and the noise and interference levels are never known, but need to be estimated.

Assuming that the co-channel interference can be treated as random noise, the optimum receiver not only needs to estimate the channel for the signal-of-interest, but also the interference level for each resource element individually. While the channel can be estimated with rather reliability using reference symbols that are multiplexed into the OFDMA signal, the interference level is estimated less precisely, especially if a high time-frequency resolution of the interference level is desired.

Analysis have shown, however, that a receiver that estimates frequency selective interference and considers these estimates in the soft-metric calculation can outperform a conventional receiver that treats the interference as a constant over the entire frequency, by several decibels when the receiver is exposed to a high level of frequency selective interference.

However, in case co-channel interference is not present, e.g., in a thermal noise limited reception scenario, the receiver performance suffers from the estimation error.

Special performance tests as proposed by the standardization body (3GPP) and adopted by the Global Certification Forum (GCF) perform most of the performance related tests without frequency selective interference. Albeit expected to outperform the conventional receiver in the field, the receiver that makes use of the frequency selective interference soft-metric calculation technique exhibits inferior performance in the test environment.

A general object of the invention is to increase LTE receiver performance in loaded networks without impacting receiver performance in unloaded networks.

SUMMARY OF THE INVENTION

The invention provides an LTE compliant Orthogonal Frequency Division Multiplex (OFMD) baseband receiver. The baseband receiver according to the invention is characterized in that it comprises a frequency selective interference estimator, interference level averaging means, and interference assessing means operative to control which output of the frequency selective interference estimator or the interference level averaging means is to be supplied to the soft-metric calculation means.

The frequency selective interference estimator is operable to estimate frequency selective interference on a per subcarrier basis or for each of several groups of subcarriers.

According to a preferred embodiment of the invention, the interference level averaging means comprise a noise level estimator operative to provide an interference level estimate averaged across all subcarriers, and the interference assessing means comprise means for assessing the frequency selectivity of the received interference, and selector means responsive to the frequency selectivity assessing means to supply either the output of the noise level estimator or of the frequency selective interference estimator to the soft-metric calculation means, in function of the determined frequency selectivity.

According to another preferred embodiment of the invention, the interference level averaging means comprise moving average means continuously adjustable between the extremes of no averaging and averaging across all subcarriers; and the averaging control means comprise means for assessing the frequency selectivity of the received interference and averaging adaptation means operative to set the length of moving averaging in function of the determined frequency selectivity.

The invention also provides a method for operating a receiver as set forth above. The method comprises the steps of: estimating frequency selective interference levels per subcarrier or group of sub-carriers; calculating at least one averaged interference level estimate averaged across at least a part of the subcarriers; assessing frequency selectivity of the interference received by the baseband receiver, and performing soft-bit calculation based on either of the frequency selective interference level estimates or either of the averaged interference level estimates, in function of the result of the frequency selectivity assessing step.

According to one embodiment of the inventive method, the step of calculating at least one averaged interference level comprises calculating an averaged interference level across all subcarriers; the step of assessing comprises assessing frequency selectivity based on an observation criterion derived from the received signal and comparing it to a predefined threshold value; and the step of performing soft-bit calculation comprises performing soft-bit calculation based on either the interference level averaged across all subcarriers or the frequency selective interference level estimates per sub-carrier or group of sub-carriers.

According to another embodiment of the inventive method, the step of calculating at least one averaged interference level comprises calculating at least two averaged interference level estimates according to at least two moving averaging parameters, and soft-bit calculation is preformed based on either one of the moving averaged interference level estimates.

One observation criterion that may be used for deciding about frequency selectivity is a ratio between received signal strengths originating from neighboring cells and the received signal strength of the signal from the servicing base station as derived from the cell searcher of the baseband receiver.

Another observation criterion that may be used for deciding about frequency selectivity is a variance of the frequency selective interference level estimates.

The threshold can be set to the cross-over point where the expected performance gain of frequency selective soft-metric calculation compensates for the losses due to the estimation error thereof.

Advantageously, the invention overcomes the performance loss of the frequency selective interference soft-metric calculation technique in frequency independent interference scenarios.

The invention combines the advantages of two known techniques by selecting the right approach for the right environment.

BRIEF DESCRIPTION OF THE DRAWINGS

Additional features and advantages of the present invention will be apparent from the following detailed description of preferred embodiments which is given by way of example only and in which reference will be made to the accompanying drawings, wherein.

DETAILED DESCRIPTION OF PREFERRED EMBODIMENTS

Figure 4:
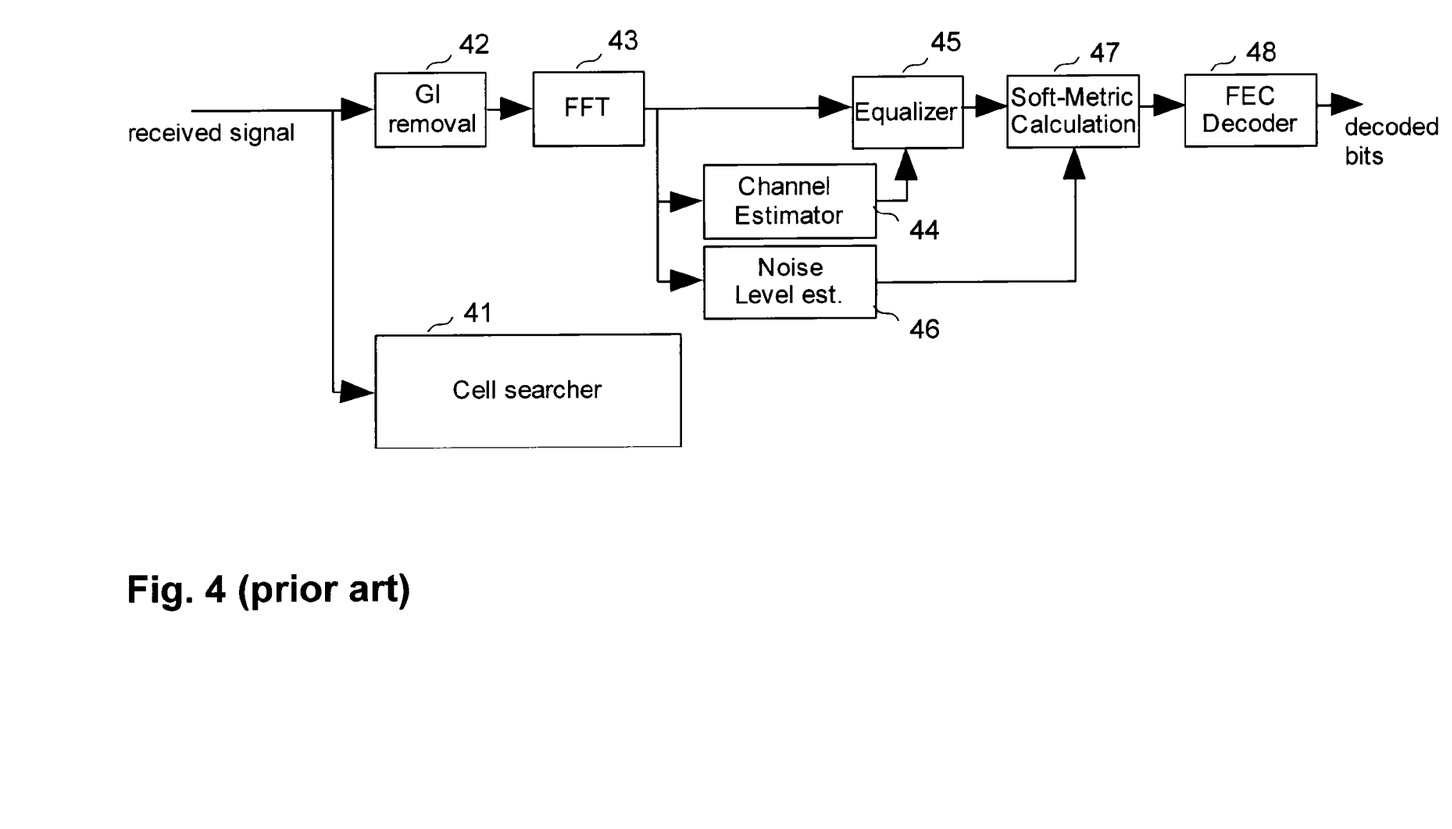
FIG. 4 shows a block diagram of a conventional LTE receiver architecture.

FIG. 4 shows a simplified block diagram of an LTE baseband receiver. The received digitized baseband signal is presented to a cell searcher 41 as well as to the actual receiver chain that starts with the removal of the guard interval (GI), at 42. Cell searcher 41 is used for initial acquisition of the signal. It searches a received signal using correlation techniques for the primary and secondary search symbols that are multiplexed into the OFDMA signal at regular intervals. Once associated to a base station, the cell searcher searches for other base station signals using the same technique and monitors the received power levels of the adjacent cells. This power level monitoring is important in preparation of a handover that becomes necessary when the user moves from one cell to another.

The samples without the guard interval are presented to an FFT block 43 that transforms a vector of received samples from time domain into frequency domain. Based on the reference symbols that are inserted by the base station transmitter at specific positions in the time frequency domain, i.e., at specific carrier locations for specific OFDM symbols, a channel estimator 44 estimates the transfer function of the channel. Also, the noise level is estimated based on these reference symbols, by noise estimator 46. The estimated channel transfer function is forwarded to an equalizer 45 that equalizes the subcarriers of the OFDM multiplex and estimates the transmitted symbols. In a processing block 47 that follows, likelihood information is added to the estimated transmit symbols output by equalizer 45 to determine true soft-metrics that are supplied to a forward error correcting (FEC) decoder 48. The soft-metrics are calculated from the signal strength received for each subcarrier, and from the noise level estimate obtained in block 46. The bits are weighted accordingly to form so called soft-bits. Based on the soft-bits that include the metrics, the FEC decoder 48 then estimates the transmitted sequence. It shall be noted that the receiver diagram shown in FIG. 4 is a conceptual drawing. Equalizer function and soft metric calculation may be combined in one functional entity. The noise level estimation may be part of the channel estimator block. The symbol demapper may be part of the soft-metric calculation block.

Figure 5:
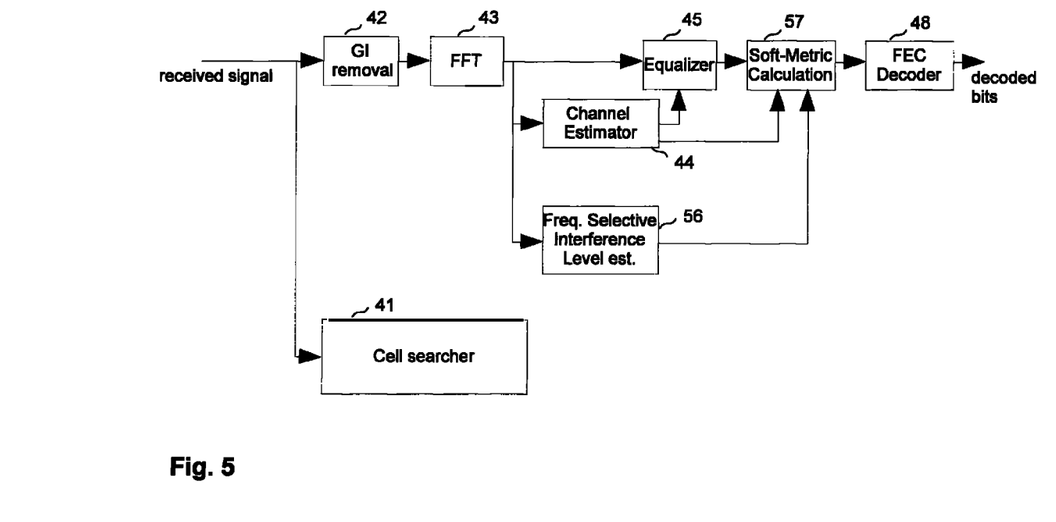
FIG. 5 shows a block diagram of an LTE receiver architecture that uses frequency selective interference level estimation.

FIG. 5 shows a more sophisticated receiver architecture that allows a better performance in interference limited environments than with the receiver of FIG. 4. In FIG. 5 the same reference numerals designate the same or equivalent processing blocks as in FIG. 4. As discussed above, in a loaded cellular system, co-channel interference becomes the dominant source of interference. Since co-channel interference originates from adjacent cell sites that use the same cellular communication standard, the characteristics of interference are similar to the characteristics of the servicing base station that transmits the desired signal. In LTE, as the base station uses OFDMA as the main multiple access scheme the co-channel interference is highly time and frequency selective, for the following reasons: In LTE, not all subcarriers need to be used. If a base station has little to transmit at a specific timing instance, some subcarriers may be left unused. The interfering base station may apply downlink power control and assign different power levels to different users. LTE allows for using beam-forming techniques. In function of the location of the receiving device in a cell, different carriers may be received with different power levels. The received interference has also passed the mobile channel that is characterized by its time and frequency selective fading.

The receiver shown in FIG. 5 individually estimates the interference level for each subcarrier or group of subcarriers, at 56. The estimated interference level for each subcarrier is considered accordingly in the soft-metric calculation, at 57. Bits derived from carriers which are exposed to a high interference level are weighted differently from bits that are derived from carriers which are exposed to less interference, even if the received signal energy was constant.

The ML decoder 58 makes use of this additional information. Thus, in a reception environment in which interference is frequency selective it exhibits better performance than the receiver shown in FIG. 4.

However, the main drawback of the receiver shown in FIG. 5 is that the frequency selective interference estimation tends to be less accurate than a combined noise level estimate. The main reason for that is that fewer samples are available for an individual carrier or a small group of carriers than for the entire ensemble. As a result, in a non-frequency selective environment the higher estimation error of frequency selective interference estimator 55 decreases the performance of a receiver which employs frequency selective interference estimation compared to a receiver which just estimates the average interference level for each OFDM symbol.

Figure 6:
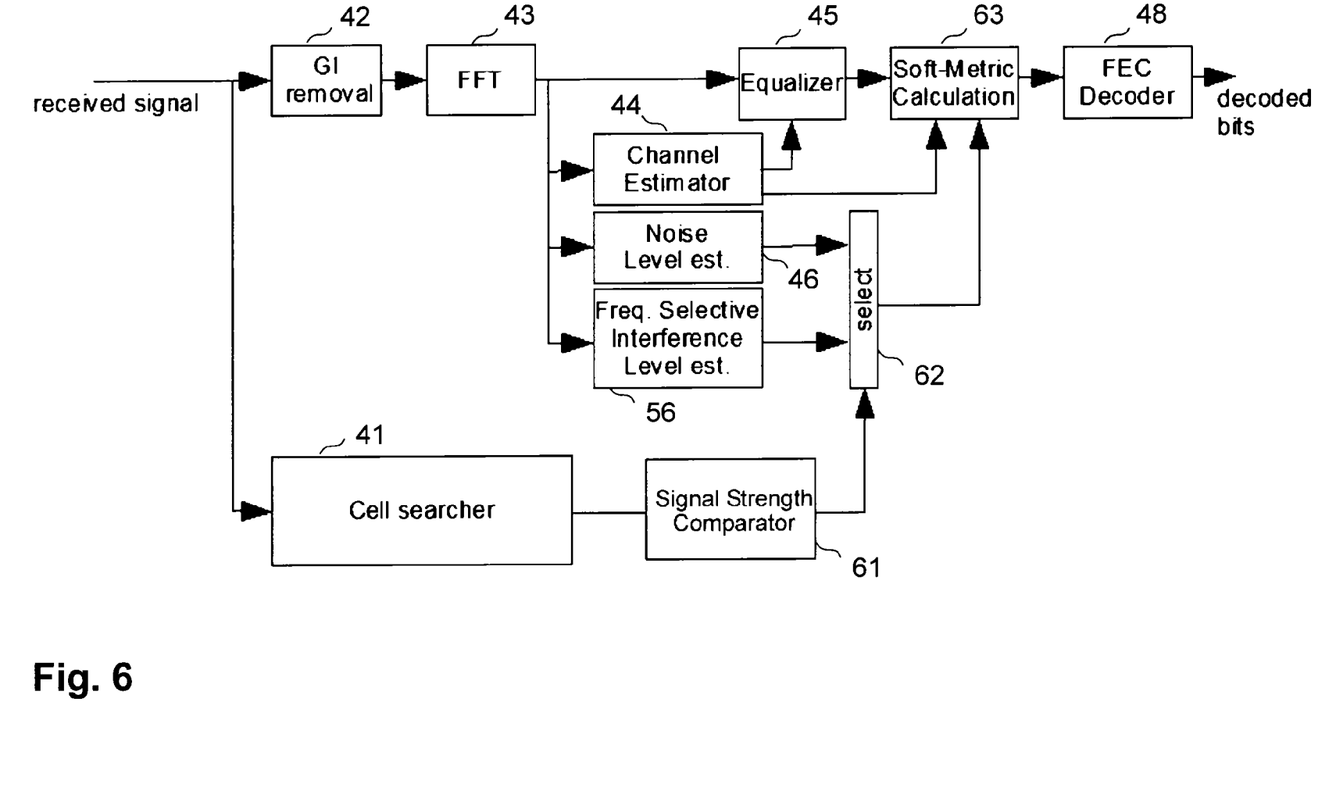
FIG. 6 shows a block diagram of a first embodiment of an LTE receiver according to the invention.
Figure 7:
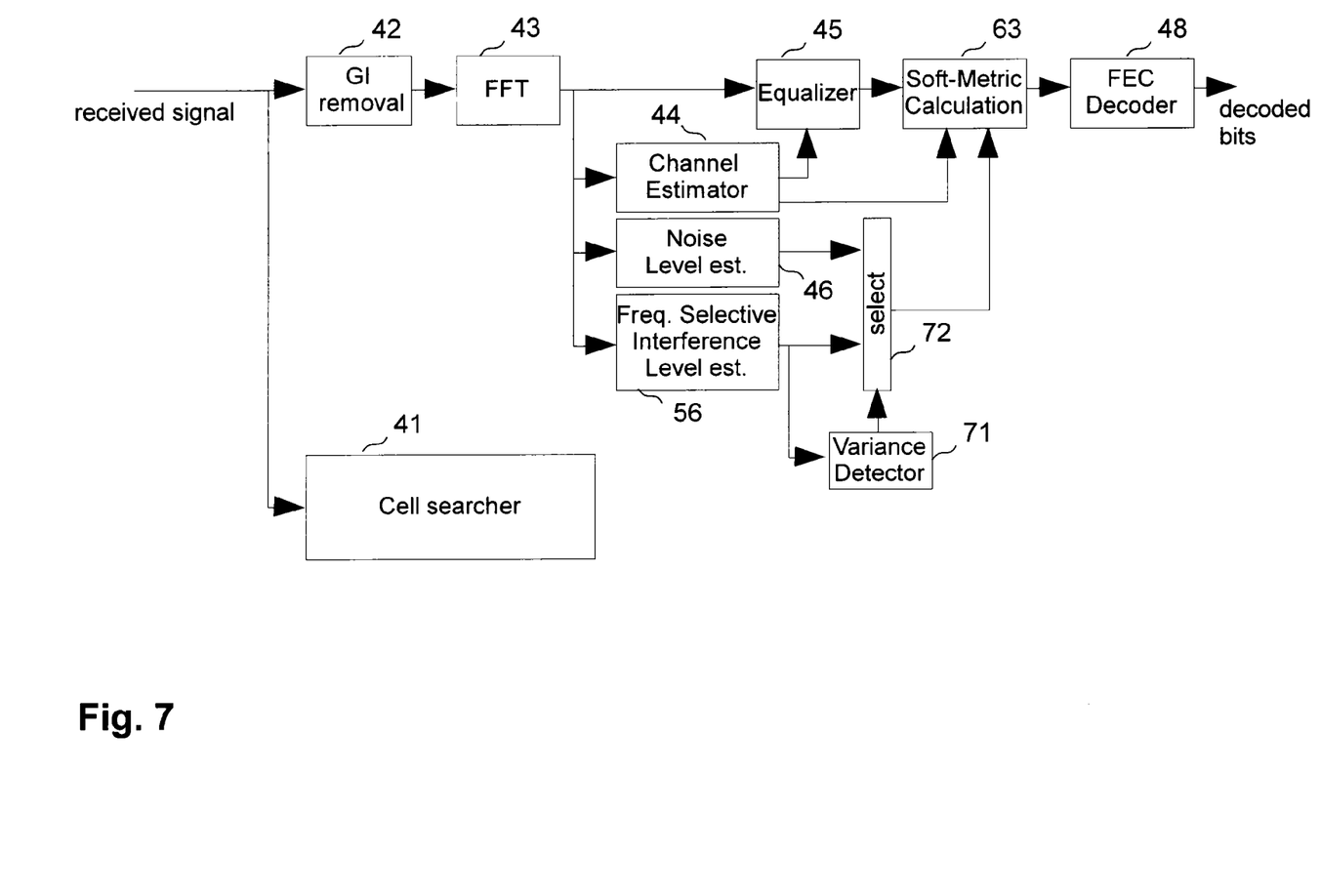
FIG. 7 shows a block diagram of a second embodiment of an LTE receiver according to the invention.
Figure 8:
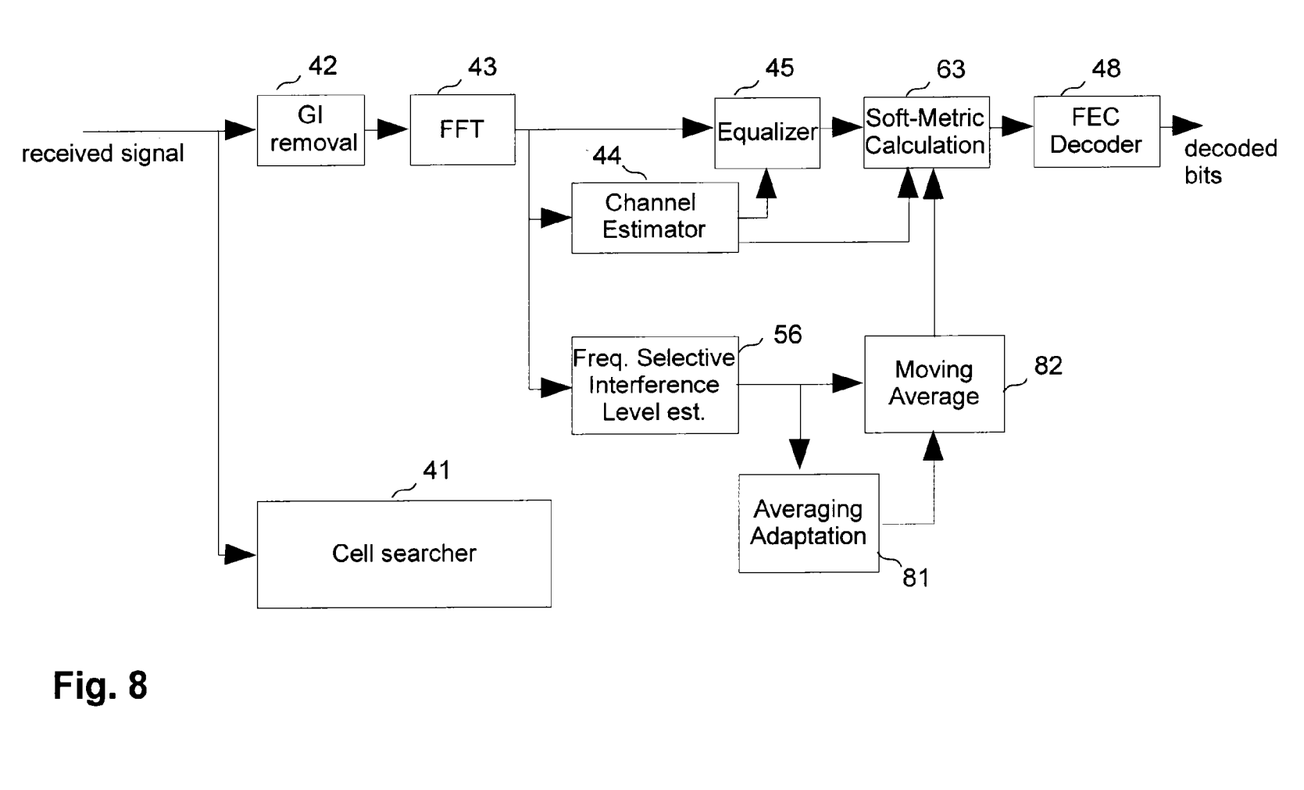
FIG. 8 shows a block diagram of a third embodiment of an LTE receiver according to the invention.

FIG. 6 to FIG. 8 illustrate embodiments of the receiver according to the invention which combine the benefits of the receiver architectures of FIG. 4 and FIG. 5. In FIGS. 6 to 8, the same reference numerals are used to designate the same or equivalent processing blocks as shown in FIG. 4 or FIG. 5, the description of which will not be repeated here for the sake of simplicity.

FIGS. 6 and 7 show embodiments of the novel receiver comprising means 56 for estimating the interference level on a subcarrier basis or a group of subcarriers similar to the frequency selective interference level estimator described with reference to FIG. 5. Also, the receiver of FIGS. 6 and 7 comprises means 46 for estimating the noise level, taking into account an average interference present at all subcarriers. Moreover, the receiver of FIGS. 6 and 7 comprises means for deciding whether the received interference level is rather frequency selective or rather frequency independent.

If it is decided that the interference is frequency selective, the frequency selective estimates from estimator 56 are used in soft-metric calculation, and if it is decided that the interference level is approximately constant and frequency independent, the noise level estimate from estimator 46 is used in soft metric calculation.

Two major ways have been found to provide a criterion for deciding about frequency selectivity of the interference:

FIG. 6 shows a block diagram of a first embodiment of a receiver according to the invention which assesses the received signal powers of the primary and secondary synchronization channels which are provided by cell searcher 41. If the searcher detects one or more adjacent cells on the same channel, the received signal strengths are compared to the signal power of the signal from the base station currently servicing the user's terminal, as shown at 61. In one embodiment, a ratio is calculated of the accumulated signal strengths of all adjacent cells detected by the cell searcher to the signal from the servicing base station. In another embodiment, a ratio is calculated of the signal strength of each adjacent cell detected by the cell searcher to the signal from the servicing base station. If the ratio(s) between the received signal strengths of the adjacent cells and the received signal strength of the signal from the servicing base station is above a certain threshold, selector 62 supplies the frequency selective interference level estimates obtained in block 56 to soft metric calculation block 63. Otherwise, the source of interference is assumed to be frequency independent, and the noise level estimate from block 46 is forwarded to soft metric calculation block 63.

According to a second embodiment which is illustrated in FIG. 7, the frequency selective interference is estimated by frequency selective interference estimator 56, and the receiver additionally comprises a variance detector 71 which calculates the variance of the estimates obtained in estimator 56. The resulting variance is used as a decision criterion about frequency selectivity of the interference. If the variance of frequency selective interference estimates is above a predefined threshold, it is decided to use the frequency selective interference level estimates for soft-metric calculation at 63, otherwise, the source of interference is assumed to be frequency independent and the noise level estimate from estimator 46 is forwarded to soft metric calculation block 63, by selector 72.

Thus, the receivers of FIGS. 6 and 7 comprise estimators for both frequency selective interference and for providing an average interference level estimate as required e.g. for thermal noise limited reception scenario. The receiver also has means to factor in the interference estimates into the soft-metrics for ML decoding. The receiver itself has two modes: (1) In the conventional reception mode, the receiver does assume that the interference is non-frequency selective and treats the interference level as a constant over frequency. (2) In the interference limited reception mode, the receiver includes the frequency selective interference estimates in the soft-metric.

For optimum performance, the threshold for switching from noise level estimate soft-metric weighting to frequency selective soft-metric weighting should be set to the cross-over point where the expected performance gain of selective soft-metric weighting compensates for the losses due to estimation error.

In a third embodiment of the invention, frequency selective interference level estimator 56 is followed by a moving average block 82, as shown in FIG. 8, which computes moving averages across the frequency band. This moving averaging is continuously adjustable between the extremes of no averaging, corresponding to the output of frequency selective interference level estimator 56, and averaging across the entire frequency band, corresponds to the function of noise level estimator 46 as described with reference to FIGS. 6 and 7, i.e., between 'fully frequency selective' and 'not frequency selective'. Moving averaging is controlled by averaging adaptation block 81, which sets the length of the moving averaging 82 the output of which is forwarded to soft-metric calculation 63.

In a modification of this embodiment, averaging adaptation switches between 'little averaging' and 'much averaging', rather than 'no averaging' and 'full averaging', corresponding to a small and a larger moving average parameter, rather than moving averaging parameters of 1 and the entire number of frequency selective estimates across the entire band.

In yet another embodiment of the invention, adaptation of averaging is not performed by switching between two prescribed averaging amounts, but rather continuously within a prescribed range of averaging amounts, based on a continuous observation variable, such as the variance of the estimated frequency selective interference.

In FIG. 8, averaging adaptation is performed based upon observed frequency selective interference estimates, using the variance criterion of the second embodiment, as described above with reference to FIG. 7.

Alternatively to FIG. 8, averaging adaptation in the LTE receiver may be performed using the 'signal strength of detected cells' criterion of the first embodiment, as described above with reference to FIG. 6.

The invention claimed is:

1. An LTE compliant Orthogonal Frequency Division Multiplex (OFMD) baseband receiver, comprising:
   a cell searcher operative to search primary and secondary search symbols that are multiplexed into an OFDM signal, and, once connected to a base station, to search other base station's signals;
   a guard interval remover;
   FFT means operative to transform a vector of received samples from time domain into frequency domain;
   a channel estimator operative to estimate a transfer function of a transmission channel;
   an equalizer operative for equalizing OFDM subcarriers and estimating transmitted symbols;
   an interference estimator;
   a soft-metric calculator operative to demap estimated transmit symbols output by the equalizer into soft bits; and
   a forward error correcting (FEC) decoder operative to estimate a transmitted bit sequence from the soft bits;
   wherein said interference estimator comprises a frequency selective interference estimator;
   and the receiver further comprises:
   an interference level averager; and
   an interference assessor operative to control which output of said frequency selective interference estimator or said interference level averager is to be supplied to said soft-metric calculator.

2. The receiver of claim 1, wherein said frequency selective interference estimator is operative to estimate frequency selective interference for each sub-carrier.

3. The receiver of claim 1, wherein said frequency selective interference estimator is operative to estimate frequency selective interference for each group of a plurality of groups of sub-carriers.

4. The receiver of claim 1,
   wherein said interference level averager comprises a noise level estimator operative to provide an interference level estimate averaged across all subcarriers, and
   wherein said interference assessor comprises:
   a frequency selectivity assessor for assessing frequency selectivity of received interference; and
   a selector responsive to the frequency selectivity assessor to supply either an output of the noise level estimator or the frequency selective interference estimator to the soft-metric calculator, as a function of the determined frequency selectivity.

5. The receiver of claim 4, wherein said frequency selectivity assessor comprises a signal strength comparator operative to calculate a ratio between received signal strengths originating from neighboring cells and received signal strength of a signal from a servicing base station as provided by the cell searcher, and to compare said ratio to a predefined threshold, and wherein the selector is responsive to the signal strength comparator to supply the output of the frequency selective interference estimator to the soft-metric calculator when said ratio is above said threshold, and to otherwise supply the output of the noise level estimator to the soft-metric calculator.

6. The receiver of claim 4, wherein said frequency selectivity assessor comprises a variance detector operative to calculate a variance of frequency selective interference estimates determined by the frequency selective interference estimator, and to compare said variance to a predefined threshold, and wherein the selector is responsive to the variance detector to supply the output of the frequency selective interference estimator to the soft-metric calculator when said ratio is above said threshold, and to otherwise supply the output of the noise level estimator to the soft-metric calculator.

7. The receiver of claim 1, wherein
   said interference level averager comprises a moving averager continuously adjustable between extremes of no averaging and averaging across all subcarriers; and wherein
   said interference assessor comprises averaging adaptation means operative to set a length of moving averaging.

* * * * *